United States Patent
Song

(10) Patent No.: US 9,145,913 B2
(45) Date of Patent: Sep. 29, 2015

(54) HOLDER FOR HELMET

(71) Applicant: Soon Young Song, Hwaseong-si (KR)

(72) Inventor: Soon Young Song, Hwaseong-si (KR)

( * ) Notice: Subject to any disclaimer, the term of this patent is extended or adjusted under 35 U.S.C. 154(b) by 0 days.

(21) Appl. No.: 14/190,105

(22) Filed: Feb. 26, 2014

(65) Prior Publication Data

US 2014/0346295 A1 Nov. 27, 2014

(30) Foreign Application Priority Data

May 23, 2013 (KR) .................... 10-2013-0058385

(51) Int. Cl.
*F16B 47/00* (2006.01)
*A42B 3/00* (2006.01)

(52) U.S. Cl.
CPC ............... *F16B 47/00* (2013.01); *A42B 3/006* (2013.01)

(58) Field of Classification Search
USPC ............... 248/205.5, 205.8, 205.9, 206.2
See application file for complete search history.

(56) References Cited

U.S. PATENT DOCUMENTS

| 7,878,467 | B2 * | 2/2011 | Chen et al. | 248/206.2 |
| 2008/0251664 | A1 * | 10/2008 | Hara et al. | 248/205.8 |
| 2009/0108153 | A1 * | 4/2009 | Hung | 248/205.8 |
| 2009/0294608 | A1 * | 12/2009 | Brassard | 248/205.5 |
| 2011/0210225 | A1 * | 9/2011 | Chen et al. | 248/363 |
| 2011/0315839 | A1 * | 12/2011 | Chen | 248/205.8 |

FOREIGN PATENT DOCUMENTS

| KR | 20-2009-0008620 | | 8/2009 |
| KR | 20-0451597 | Y1 | 12/2010 |
| KR | 10-1176416 | B1 | 8/2012 |
| KR | 10-2012-0124742 | A | 11/2012 |

* cited by examiner

*Primary Examiner* — Steven Marsh
(74) *Attorney, Agent, or Firm* — Revolution IP, PLLC

(57) ABSTRACT

Disclosed is a holder for the helmet, in which an suction band is formed by directly applying an adhesive soft material or by attaching a molded adhesive soft product to only the other portion of a pad except a center portion so that a vacuum state can be generated in the center portion of the pad; the suction band has a curved surface so as to be strongly mounted to even the helmet having a rounded shape; and a projection ring is formed on a circumference of the pad and a circumference of an inner circle of the pad to which the suction band will be attached so that the suction band can be easily formed on the pad.

4 Claims, 5 Drawing Sheets

(a)

(b)

(a)

(b)

(a)

(b)

HOLDER FOR HELMET

CROSS-REFERENCE TO RELATED APPLICATION

This application claims priority to and the benefit of Korean Patent Application No. 10-2013-0058385 filed in the Korean Intellectual Property Office on May 23, 2013, the entire contents of which are incorporated herein by reference.

BACKGROUND OF THE INVENTION (a) Field of the Invention

The present invention relates to a holder for a helmet, and more particularly to a holder for a helmet in which an suction band is formed by directly applying an adhesive soft material or by attaching a molded adhesive soft product to only the other portion of a pad except a center portion so that a vacuum state can be generated in the center portion of the pad; the suction band has a curved surface so as to be strongly mounted to even the helmet having a rounded shape; and a projection ring is formed on a circumference of the pad and a circumference of an inner circle of the pad to which the suction band will be attached so that the suction band can be easily formed on the pad.

(b) Description of the Related Art

Nowadays, a vehicle employs various holders for mounting a navigator, a small computer, a cup, a mobile phone, and convenience goods. These holders employ a suction plate based on a principle of a sucker so as to couple the goods to the vehicle without damaging the outer appearance of the vehicle. To effectively attach the suction plate to the glass or body of the vehicle, an operation lever is used to pull a center portion of the suction plate.

A typical suction plate is not mounted to the vehicle if the center portion of the suction plate is not pulled by the operation lever, and it is impossible to mount the navigator, a liquid crystal display (LCD) and other convenience goods to the vehicle if the operation level is not pulled. This is because, the suction plate is made of transparent rubber or plastic, and configured to be attached to the glass or body of the vehicle by compression pressure caused by the operation lever.

However, the typical suction plate is configured to be attached to the glass or body of the vehicle which has a flat surface, and it is therefore difficult to mount the holder including the typical suction plate to a rounded surface. That is, the holder with such a typical suction plate cannot be mounted to and used for an object having a rounded surface such as a helmet.

As a five-day work week has been introduced, people have spent a lot of time on enjoying outdoor and leisure activities. For example, people who go a paraglider and a hang-glider for the leisure activity has been growing more and more.

Thus, the people who enjoy the paraglider and the hang-glider have tried to mount a camera to a helmet in order to photograph themselves while flying. However, if the camera is mounted to the existing holder for the vehicle and the suction plate of this holder is attached to the helmet, it is very difficult to mount the camera to the helmet because the surface of the helmet is rounded.

Specifically, the helmet has a circular or elliptical shape, and therefore it is difficult to attach the suction plate to the helmet if the existing holder for the vehicle is used. Further, the sucking ability of the suction plate is deteriorated and easily detached.

In particular, the hang-glider or paraglider flies at a speed of 200~250 Km/h, and thus the sucking ability of the exiting holder is not enough to normally mount the camera to the helmet.

SUMMARY OF THE INVENTION

Accordingly, the present invention is conceived to solve the forgoing problems, and an aspect of the present invention is to provide a holder for a helmet in which an suction band is formed by directly applying an adhesive soft material or by attaching a molded adhesive soft product to only the other portion of a pad except a center portion so that a vacuum state can be generated in the center portion of the pad; the suction band has a curved surface so as to be strongly mounted to even the helmet having a rounded shape; and a projection ring is formed on a circumference of the pad and a circumference of an inner circle of the pad to which the suction band will be attached so that the suction band can be easily formed on the pad.

In accordance with an aspect of the present invention, there is provided a holder for a helmet, which includes a detachable mounting unit detachably mounted to the helmet, and a cradle that is connected to a second end of a connecting unit having a first end connected to the detachable mounting unit and supports an object, the detachable mounting unit including: a base shaped like a hemisphere having an inner space and a shaft hole perpendicularly formed on an upper surface toward the inner space; a circular pad placed beneath the base; a shaft fitted into the shaft hole, movable up and down, and having a lower end fastened to a center portion of the pad; a spring put on the shaft and maintaining elasticity between the pad and the base; a moving lever rotatably coupled to an upper end of the shaft and moving up and down the shaft; and an suction band attached to a lower surface of the pad and attached to the other portion of the pad except the center portion in a form of a circular band.

The suction band may be attached between a circumference of the pad and a circumference of an inner circle having a radius at a point between the center of the pad and the circumference of the pad, and inclined downward from the circumference of the inner circle toward the circumference of the pad.

The suction band may have a surface curved from the circumference of the inner circle toward the circumference of the pad.

A projection ring may be formed protruding upward along the circumference of the pad and the circumference of the inner circle.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Figure 1:
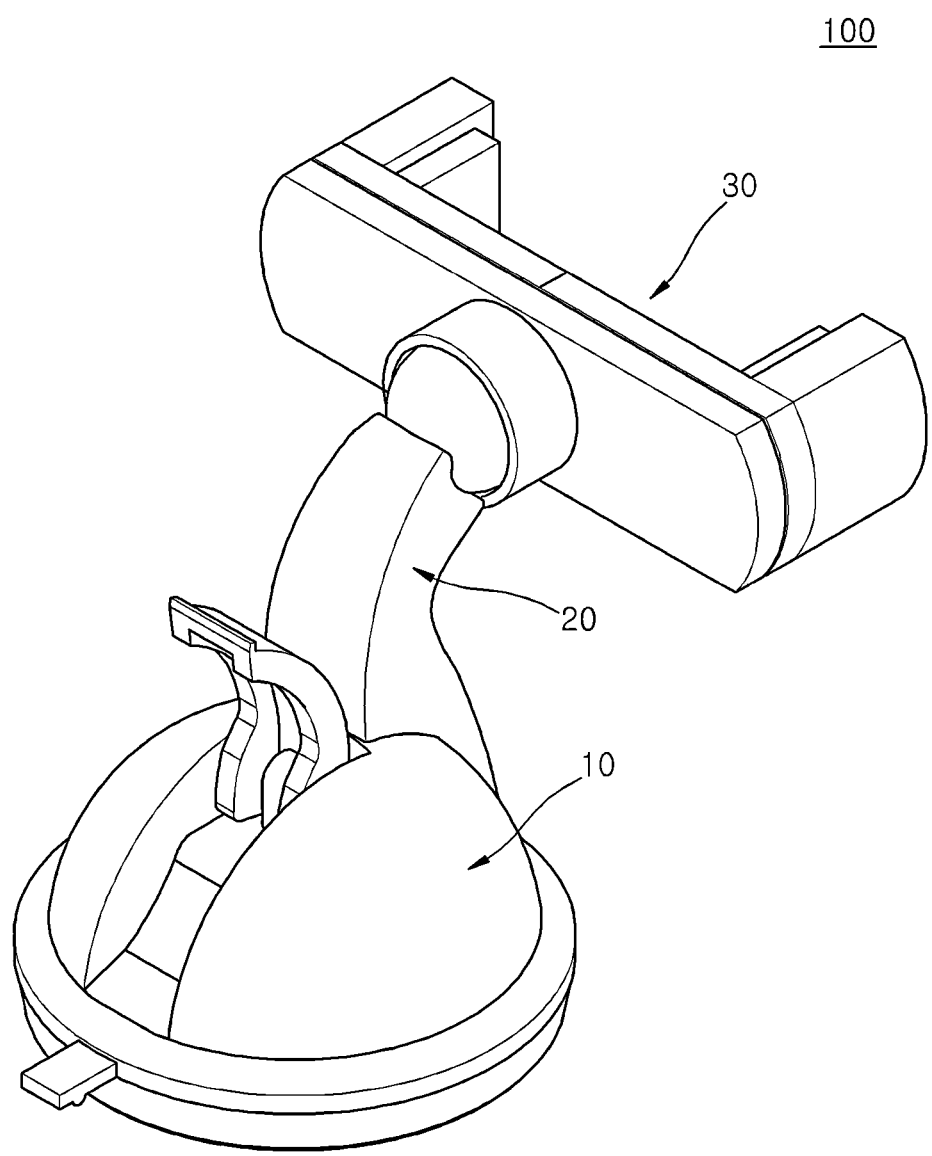
FIG. 1 is a perspective view of a holder for a helmet according to an embodiment of the present invention.

Hereinafter, exemplary embodiments of a holder for a helmet according to the present invention having the foregoing problems, solutions and effects will be described with reference to accompanying drawings.

Elements shown in the drawings may be exaggerated in size, shape, etc. for clarity and convenience of the description. Also, terms specially defined in consideration of configurations and operations of the present invention may vary depending on intention or practice of users and operators.

FIG. 1 is a perspective view of a holder for a helmet according to an embodiment of the present invention.

As shown in FIG. 1, the holder 100 for the helmet according to an embodiment of the present invention includes a detachable mounting unit 10 detachably mounted to the helmet, and a cradle 30 connected to a second end of a connecting unit 20 having a first end connected to the detachable mounting unit and supports an object and supporting an object.

The detachable mounting unit 10 may be configured to be attached to the helmet by generating suction and vacuum state, or detached from the helmet by releasing the suction and the vacuum state, details of which will be described later.

The detachable mounting unit 10 and the cradle 30 for supporting the object are connected by the connecting unit 20. The connecting unit 20 may have various shapes as long as it has a first end connected to the detachable mounting unit 10 and a second end connected to the cradle 30. That is, the connecting unit 20 may be provided by a single frame, and by connection of a plurality of frames. Here, the plurality of frames may be rotated or folded with respect to each other.

The cradle 30 may be configured to hold and support a device for a variety of functions. For example, the cradle 30 is configured to support a camera or the like image photographing device, etc. as well as a smart phone, a personal digital assistant (PDA), a navigator, etc. Accordingly, the cradle 30 may have various shapes depending on the shapes of the device to be supported.

The cradle 30 may be fastened to the second end of the connecting unit 20, but may be rotatably coupled to the connecting unit 20 so that the device supported on the cradle 30 can be variously changed in direction.

For example, the device supported on the cradle 30 may include the camera. Thus, the camera is rotatably coupled to the connecting unit 20 and changed in direction to photograph the front, the side or the rear.

Specifically, if a person flies with a paraglider while attaching the holder 100 to the helmet, s/he can photograph the front or the rear, i.e., her/his own face by controlling the direction of the camera mounted to the helmet.

At this time, the holder 100 has to be strongly attached to the helmet. To this end, the holder 100 for the helmet includes the detachable mounting unit 10 having a structure to be strongly attached to the helmet.

Figure 2:
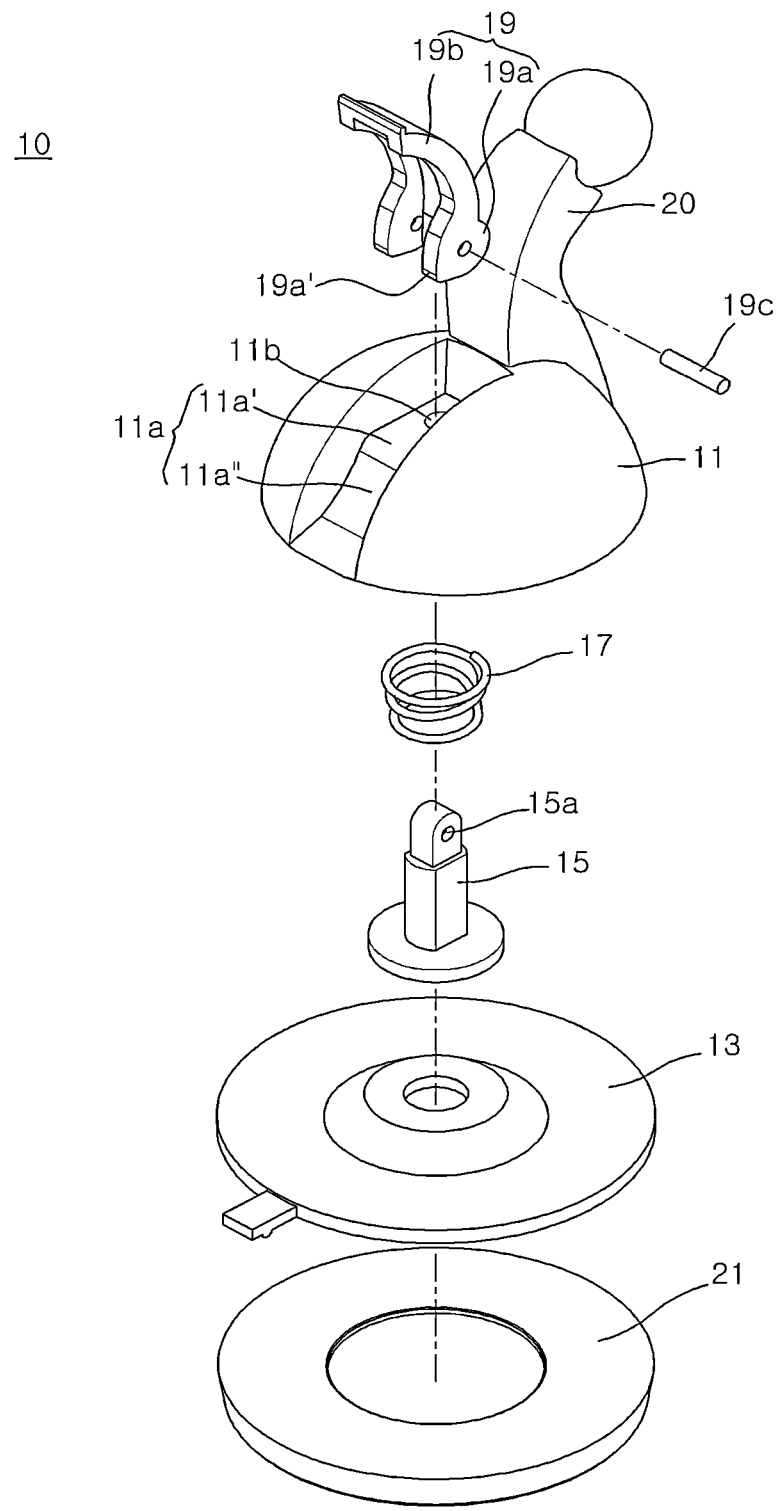
FIG. 2 is an exploded perspective view of a detachable mounting unit in the holder for the helmet according to an embodiment of the present invention.

FIG. 2 is an exploded perspective view of the detachable mounting unit 10 in the holder 100 for the helmet according to an embodiment of the present invention.

As shown in FIG. 2, the detachable mounting unit 10 in the holder for the helmet according to an embodiment of the present invention includes a hemispherical base 11, a pad 13 arranged under the base 11, a shaft 15 fastened to the center of the pad 13, a spring 17 maintaining elasticity as being put on the shaft 15, a moving lever 19 rotatably coupled to an upper end of the shaft 15, and an suction band 21 attached to a bottom surface of the pad 13.

The base 11 has a hemispherical shape having an inner space. That is, the base 11 is made of a hard plastic material and shaped like a hemispherical cap. The first end of the connecting unit 20 is connected to one side of an upper surface of the base 11.

A mounting groove 11a is recessed and formed from a center portion to a lower end on an upper surface of the base 11. A bottom surface of the mounting groove 11a includes a horizontal surface 11a' and an inclined surface 11a", and the horizontal surface 11a' and the inclined surface 11a" are connected to each other.

The mounting groove 11a formed on the upper surface of the base 11 provides a space in which the moving lever 19 is mounted and operates. That is, the moving lever 19 is rotatably hinged to an upper end of the shaft 15 within the mounting groove 11a.

The base 11 includes a shaft hole 11b perpendicularly formed on the upper surface toward the inner space. Specifically, the shaft hole 11b is perpendicularly formed on the horizontal surface 11a' of the mounting groove 11a toward the inner space. Through the shaft hole 11b, the upper end of the shaft 15 protrudes within the mounting groove 11a and is rotatably coupled to the moving lever 19. This will be described later.

The circular pad 13 is placed beneath the base 11. Specifically, the circular pad 13 is placed beneath the base 11 and made of a material of which a center portion is lifted up as the shaft 15 moves up as it is attached to a rounded surface such as the helmet. That is, the pad 13 may be made of a flexible material such as soft rubber, polyvinyl chloride (PVC), etc.

Figure 4:
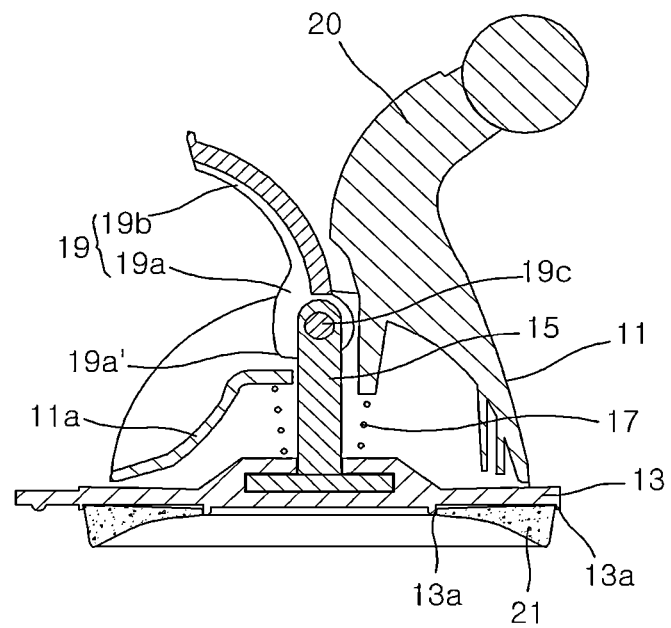
FIG. 4 is a view showing operations of the holder for the helmet according to an embodiment of the present invention.
Figure 4:
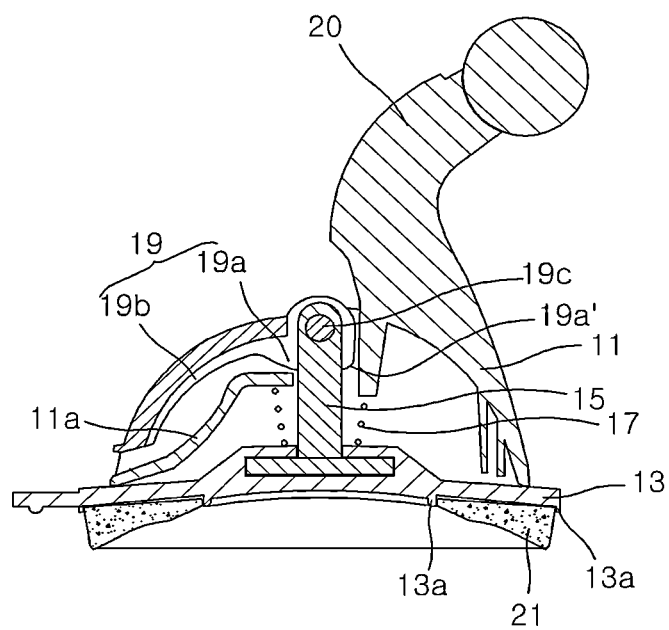

Meanwhile, a lower end of the base 11 is not flat but rounded as shown in FIG. 4. Therefore, when the pad 13 shaped like a circular plate moves up, the outer portion of the pad also minutely moves up and contacts an end portion, i.e., the rounded surface of the base 11, which will be described later.

The shaft 15 is fastened as standing on a top center portion of the pad 13. That is, a lower end of the shaft 15 is fastened to the center of the pad 13. Further, the shaft 15 is placed within the inner space of the base 11 so that the upper end of the shaft 15 can pass through the shaft hole 11b and be placed within the mounting groove 11a.

That is, the shaft 15 is inserted in the shaft hole 11b and movable up and down, while having the upper end placed within the mounting groove 11a and the lower end fastened to the center of the pad 13.

The shaft 15 may move up and down by operations of the moving lever 19, which will be described later. That is, if the moving lever 19 is pushed down, the shaft 15 moves up, thereby lifting up the center portion of the pad 13 connected to the lower end of the shaft 15. On the other hand, if the moving lever 19 is returned to its original position, the shaft 15 moves down by restoring force of the spring, thereby returning the pad 13 to its original state.

At this time, the spring 17 is provided in the inner space of the base 11 in order to restore the shaft 15 and the pad 13 to their original states. That is, the spring 17 is put on the shaft 15 and arranged to maintain the elasticity between the pad 13 and the base 11.

Specifically, the spring 17 has a lower end contacting the pad 13 and an upper end contacting an upper surface within the inner space of the base 11 as being put on the shaft 15, thereby maintaining certain elasticity.

In this state, if the moving lever 19 is pushed down, the shaft 15 moves up along the shaft hole 11b and the center portion of the pad 13 is also lifted up, thereby compressing the spring 17. Thereafter, if the moving lever 19 is pushed up, the shaft 15 and the center portion of the pad 13 are moved down and return to their original positions by the restoring force of the spring 17.

The moving lever 19 causing the shaft 15 to move up and down includes an eccentric-rotation coupling portion 19a rotatably hinged to the upper end of the shaft 15, and a rotation handling portion 19b connected to and rotating the eccentric-rotation coupling portion 19a.

The eccentric-rotation coupling portion 19a is rotatably hinged to the upper end of the shaft 15. Specifically, a hinge coupling pin 19c is inserted in and connecting a hinge coupling hole 15a formed in the upper end of the shaft 15 and a hinge coupling hole (not shown) formed in the eccentric-rotation coupling portion 19a, so that the eccentric-rotation coupling portion 19a of the moving lever 19 can be hinged to the upper end of the shaft 15.

The rotation of the eccentric-rotation coupling portion 19a is performed by handling the rotation handling portion 19b. That is, if a user pushes up or down the rotation handling portion 19b, the eccentric-rotation coupling portion 19a is rotated correspondingly.

The eccentric-rotation coupling portion 19a is formed with an eccentric cam portion 19a' so that the shaft 15 hinged to the eccentric-rotation coupling portion 19a can move up or down as the eccentric-rotation coupling portion 19a rotates.

That is, the eccentric-rotation coupling portion 19a is rotatably hinged to the upper end of the shaft 15, and has the eccentric cam portion 19a' partially protruding in order to have the eccentric structure.

The eccentric cam portion 19a' of the eccentric-rotation coupling portion 19a is arranged to be in contact with and supported on the horizontal surface 11a' in the bottom surface of the mounting groove 11a. When the rotation handling portion 19b is pressed, the eccentric-rotation coupling portion 19a rotates so that the shaft 15 being in contact with and supported on the horizontal surface 11a' moves up by the eccentric cam portion 19a'.

Then, the center portion of the pad 13 coupling with the lower end of the shaft 15 is lifted up, and the spring 17 is compressed. Thereafter, if the rotation handling portion 19b is pushed up and returns to its original position, the shaft 15 moves down by the restoring force of the spring 17 and at the same time the center portion of the pad 13 is also returned to its original position.

If the shaft 15 moves up and the center portion of the pad 13 is lifted up in accordance with the operation of the moving lever 19 having the foregoing configurations and operations, a vacuum state is generated between the pad 13 and a mounting surface (e.g., an outer surface of the helmet or the like). Therefore, the detachable mounting unit 10 can be strongly attached to the mounting surface such as the outer surface of the helmet, etc.

In order to generate the vacuum state between the pad 13 and the mounting surface (e.g., the outer surface of the helmet, etc.) by lifting up the center portion of the pad 13, air has to be prevented from being introduced in between the pad 13 and the mounting surface (e.g., the outer surface of the helmet, etc.).

To this end, an suction band, which is made of a bond gel material, strongly adsorbed onto the mounting surface, and cuts off air introduced from the outside, i.e., an suction band 21 is attached to the bottom surface of the pad 13. The suction band 21 may be formed by directly applying an adhesive soft material to the other portion of the pad except the center portion, or by attaching a molded adhesive soft product to the other portion of the pad except the center portion. Specifically, the suction band 21 is attached to the bottom surface of the pad 13, i.e., attached to the other portion of the pad 13 except the center portion in the form of a circular band.

As above, the suction band 21 is attached along the outer circumference of the pad 13 except the center portion 13. Therefore, if the detachable mounting unit 10 is mounted to the mounting surface such as the surface of the helmet, the suction band 21 is strongly attached to the mounting surface. In this state, if the moving lever 19 is pushed down, the shaft 15 moves up and the center portion of the pad 13 is lifted up, thereby generating the vacuum state in between the center portion of the pad 13 and the mounting surface.

That is, the suction band 21 prevents introduction of external air while the center portion of the pad 13 is lifted up, so that the vacuum state can be generated in between the center portion of the pad 13 and the mounting surface, thereby strongly attaching the detachable mounting unit to the mounting surface.

Figure 3:
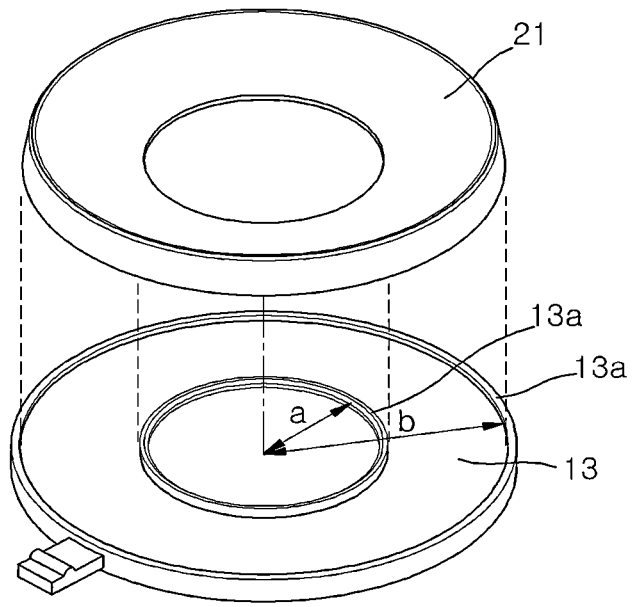
FIG. 3 is a detailed view of a pad and an suction band in the holder for the helmet according to an embodiment of the present invention.
Figure 3:
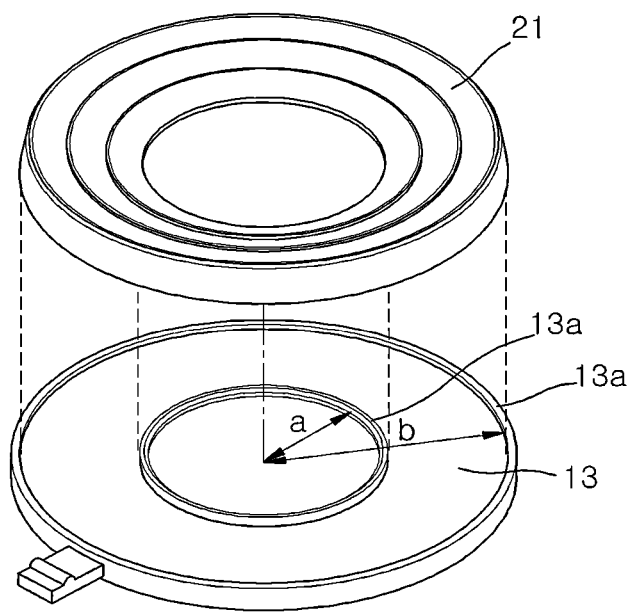

FIG. 3 shows a coupling relationship and a detailed structure between the pad 13 and the suction band 21 according to an embodiment of the present invention.

As shown in (a) of FIG. 3, the suction band 21 is attached between a circumference of the pad 13 and a circumference of an inner circle having a radius of a at a point between the center of the pad 13 and the circumference of the pad 13.

That is, the suction band 21 is attached to the pad 13, i.e., to the entire space between the circumference of the inner circle having the radius of a and the circumference of the pad 13 having a radius of b (i.e., the radius of the pad 13). Thus, the suction band 21 is shaped like the circular band.

Meanwhile, the surface of the suction band 21, which is attached to the mounting surface such as the surface of the helmet, is not flat but curved or inclined. Specifically, as shown in (a) of FIG. 3, the suction band 21 is inclined downward from the circumference of the inner circle to the circumference of the pad 13.

That is, the suction band 21 becomes thicker from the circumference of the inner circle toward the circumference of the pad 13. Specifically, the suction band 21 is the thinnest in the circumference of the inner circle of the pad 13, and the thickest in the circumference of the pad 13.

As above, the suction band 21 is inclined, and preferably curved downward from the circumference of the inner circle toward the circumference of the pad 13.

Specifically, the surface of the suction band 21 may be obliquely inclined. Preferably, the surface of the suction band 21 may be curved from the circumference of the inner circle toward the circumference of the pad 13.

In the foregoing detachable mounting unit 10 according to an embodiment of the present invention, the suction band 21 is attached to the outer circumference of the pad 13 except the center portion of the pad 13 (i.e., attached between the circumference of the inner circle and the circumference of the pad), and inclined from the circumference of the inner circle toward the circumference of the pad 13 so that the suction band 21 can have an oblique or curved surface, thereby not only strongly attaching the suction band 21 to the mounting surface when the detachable mounting unit 10 is attached to a rounded mounting surface such as the surface of the helmet, but also maintaining the vacuum state between the center portion of the pad 13 and the mounting surface by cutting off the introduction of air while the center portion of the pad 13 moves up.

As shown in (a) of FIG. 3, the suction band 21 has a smoothly curved surface from the circumference of the inner circle toward the circumference of the pad 13, but not limited thereto. Alternatively, as shown in (b) of FIG. 3, the suction band 21 may have a stepwise surface.

That is, as shown in (b) of FIG. 3, the suction band 21 has a surface rounded from the circumference of the inner circle toward the circumference of the pad 13, through several stepwise structures. This structure also makes the surface of the suction band 21 be generally rounded.

As described above, the suction band 21 is attached to the space in between the circumference of the inner circle of the pad 13 and the circumference of the pad 13. The suction band 21 is attached to and formed in the pad 13 by accommodating molten gel in a jig frame and maintaining contact between the pad 13 and the molten gel.

Meanwhile, a projection ring 13a may be formed on the pad 13 in order to easily attach the suction band 21 to only the space between the circumference of the inner circle of the pad 13 and the circumference of the pad 13 while the suction band 21 is attached onto the pad 13.

Specifically, as shown in FIG. 3, the projection ring 13a may protrude from the circumference of the pad 13 and the circumference of the inner circle of the pad 13 upward along the circumferences. That is, the projection rings 13a are respectively formed on the circumference of the inner circle and the circumference of the pad 13 and of the pad 13

Figure 5:
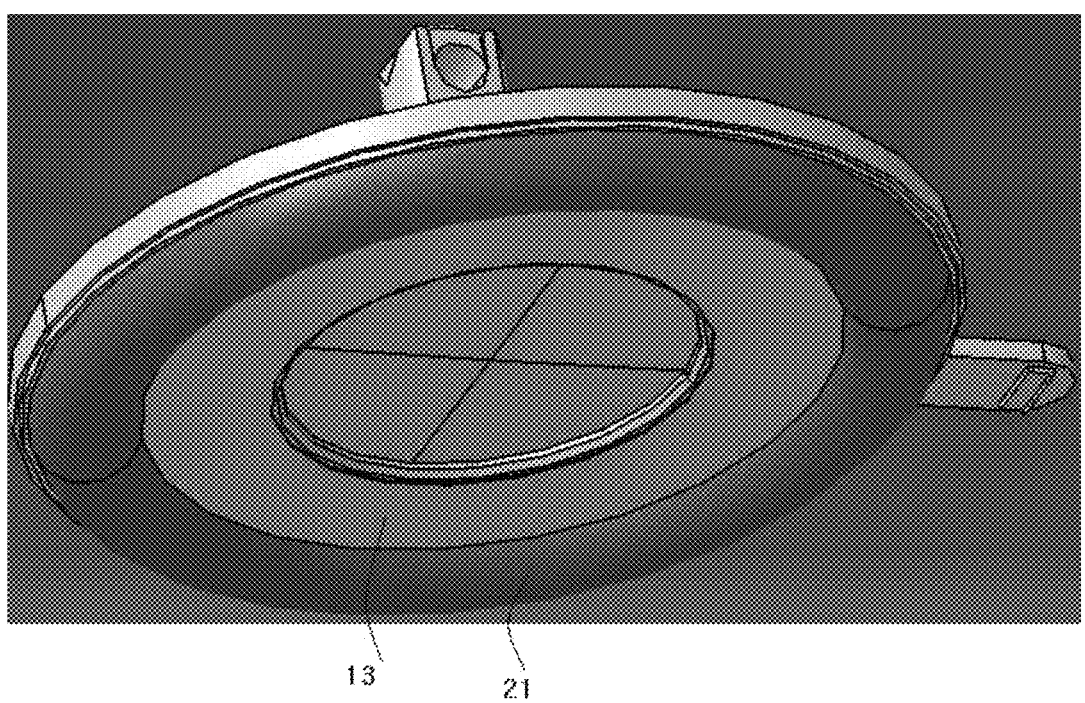
FIG. 5 is a perspective view of another suction band in the holder for the helmet according to an embodiment of the present invention.

Meanwhile, the suction band 21 formed on the pad 13 may have a different shape from the shape shown in FIG. 3. For example, as shown in FIG. 5, the suction band 21 may be made of the adhesive soft product such as gel to be attached along the outer portion of the pad 13.

Specifically, the suction band 21 may have a shape obtained by horizontally slicing an annular ring shaped liked a donut. Thus, the suction band 21 has a vertical cross-section of a semicircular shape, and the pad 13 attached to the suction band 21 may have a rounded surface.

Therefore, the suction band 21 having a shape obtained by slicing the donut shape in half is attached in the form of the ring along the outer portion of the pad 13, and constitutes the detachable mounting unit 10. Thus, if the detachable mounting unit 10 is attached to the rounded surface of the helmet, the suction band 21 attached to the rounded surface of the helmet also has a rounded contact surface, and therefore the suction band 21 can be strongly attached to the surface of the helmet. Thereafter, if the moving lever 19 is pushed down, the shaft 15 moves up to thereby maintain a strong vacuum state between the pad 13 and the mounting surface of the helmet.

With the foregoing structure and operation, the holder 100 for the helmet has an advantage that the detachable mounting unit 10 is easily attached to the rounded surface such as the helmet.

FIG. 4 is a cross-section view for explaining operations of the detachable mounting unit 10 according to an embodiment of the present invention. (a) of FIG. 4 shows a state before the detachable mounting unit 10 is completely attached to the mounting surface such as the external surface of the helmet, and (b) of FIG. 4 shows a state that the detachable mounting unit 10 is completely attached to the mounting surface such as the external surface of the helmet.

The state shown in (a) of FIG. 4 illustrates that the detachable mounting unit 10 is primarily attached to the mounting surface. At this time, the suction band 21 attached to the other portion of the pad 13 except the center portion is strongly attached to the mounting surface.

In this state, if the moving lever 19 is pushed down as shown in (b) of FIG. 4, the shaft 15 moves up and the center portion of the pad 13 fastened to the lower end of the shaft 15 is lifted up. Also, the outer portion of the pad 13 also somewhat moves up and is in contact with the end portion surface of the base 11, i.e., the rounded surface.

Thus, the suction band 21 can be maintained as being strongly attached to the mounting surface while the center portion of the pad 13 is lifted up, and therefore the external air cannot be introduced in between the center portion of the pad 13 and the mounting surface via the suction band 21. Accordingly, the strong vacuum state can be maintained in between the center portion of the pad 13 and the mounting surface.

The suction band 21 is strongly coupled to the mounting surface and the strong vacuum state is maintained in between the mounting surface and the center portion of the pad 13, so that the detachable mounting unit 10 can be strongly mounted to the rounded surface such as the surface of the helmet.

In the holder for the helmet according to an embodiment of the present invention, the suction band is attached to and formed on the other portion of the pad except the center portion so that the vacuum state can be generated in the center portion of the pad, and the suction band has a curved surface so as to be strongly attached to even the helmet having the rounded shape. Further, the projection ring is formed on the circumference of the pad and the circumference of the inner circle of the pad to which the suction band will be attached, so that the suction band can be easily formed on the pad.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A holder for a helmet, comprising:
   a detachable mounting unit detachably mounted to the helmet; and
   a cradle connected to a second end of a connecting unit having a first end connected to the detachable mounting unit and supports an object,
   the detachable mounting unit comprising,
   a hemisphere-shaped base having an inner space,
   a shaft hole perpendicularly formed on an upper surface toward the inner space,
   a circular pad placed beneath the base, the circular pad comprising,
      a space between a circumference of an inner circle of the pad and a circumference of the pad, and
      a projection ring formed by protruding upward along the circumference of the inner circle of the pad and the circumference of the pad,
   a shaft fitted into the shaft hole, movable up and down, and having a lower end fastened to a center portion of the pad,
   a spring mounting on the shaft and maintaining elasticity between the pad and the base,
   a moving lever rotatably coupled to an upper end of the shaft and moving up and down the shaft, and
   an suction band attached to a lower surface of the pad, attached to the other portion of the pad except the center portion in a form of a circular band, wherein the suction band is attached to and formed in the space of the pad by accommodating molten gel in a jig frame and maintaining contact between the pad and the molten gel.

2. The holder for the helmet according to claim 1, wherein the suction band is attached between the circumference of the pad and the circumference of the inner circle having a radius at a point between the center of the pad and the circumference of the pad, and inclined downward from the circumference of the inner circle toward the circumference of the pad.

3. The holder for the helmet according to claim 1, wherein the suction band has a surface curved from the circumference of the inner circle toward the circumference of the pad.

4. The hold for the helmet according to claim 3, wherein the surface of the suction band has a plurality of stepwise structures forming the surface generally rounded.

\* \* \* \* \*